UNITED STATES PATENT OFFICE.

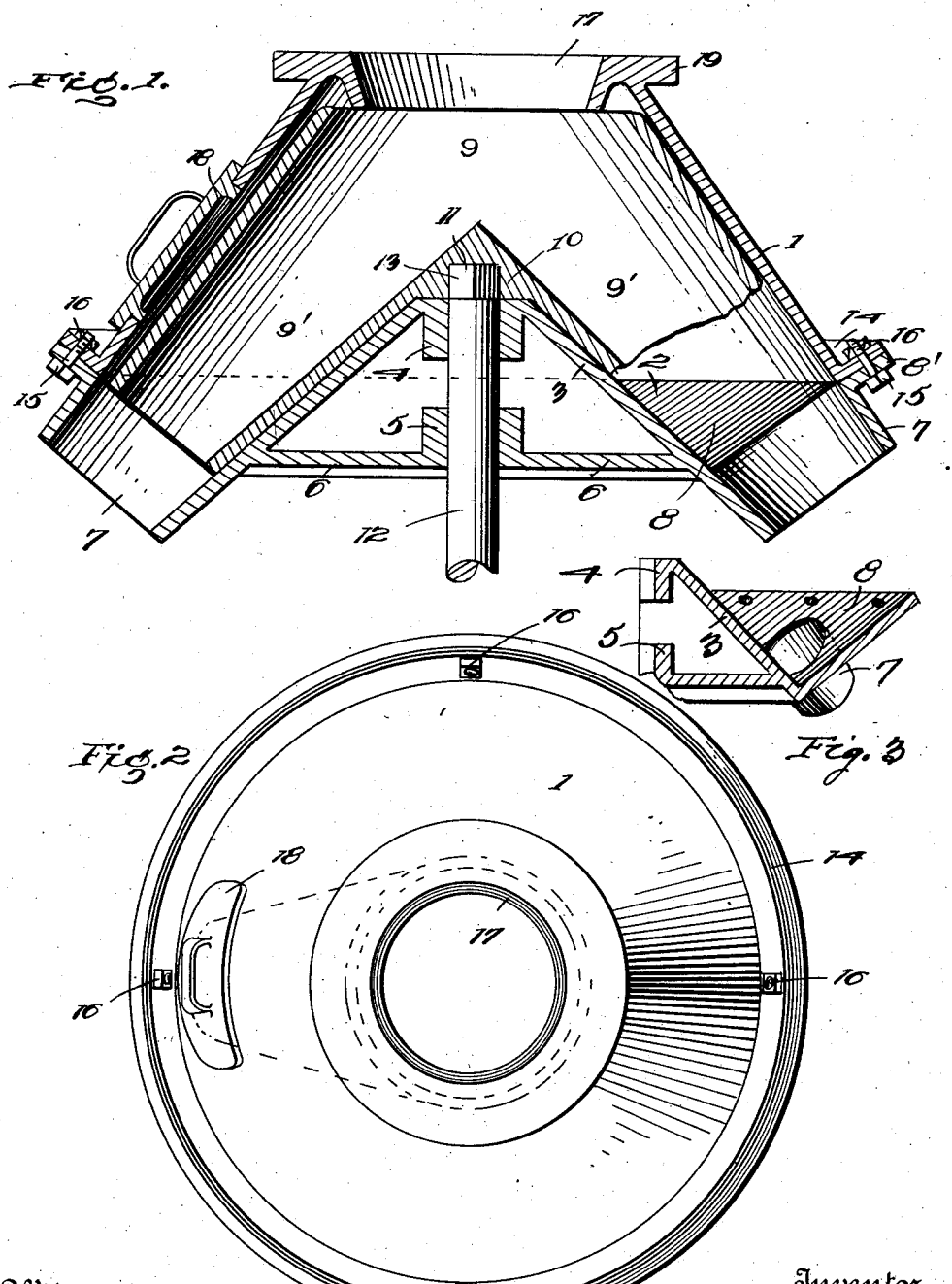

JOHN L. FERGUSON, OF AKRON, OHIO.

STREAM-DIVIDING APPARATUS.

1,021,766.   Specification of Letters Patent.   Patented Apr. 2, 1912.

Application filed April 6, 1911. Serial No. 619,390.

*To all whom it may concern:*

Be it known that I, JOHN L. FERGUSON, a citizen of the United States, residing at Akron, in the county of Summit and State of Ohio, have invented certain new and useful Improvements in Stream-Dividing Apparatus, of which the following is a specification, reference being had therein to the accompanying drawing.

This invention relates to stream dividers of the class which are used principally for dividing a stream of grain, cereal, sand, cement, liquid or any other desired substance. This is used principally in mills and grain elevators where it is desired to divide a stream of grain or other free running material into two or more parts. This is accomplished by having a hopper provided with a plurality of outlet openings and having inside of the hopper a revolving delivery chute which turns continually and causes the streams of grain to enter each outlet as the delivery chutes pass over the same. The amount of grain delivered at each passing may be regulated by the speed with which the delivery chute passes over the opening. In this manner the device may be used for delivering measured quantities of material.

This invention is illustrated in the accompanying drawings; wherein—

Figure 1 is a vertical sectional view through the divider. Fig. 2 is a top plan view of the divider. Fig. 3 is a fragmentary view of the lower portion of the casing.

This invention comprises a casing which is provided with an upper member 1 and a lower member 2. The lower member 2 has a conical central portion 3 which is provided with a centrally located bearing 4 and a guiding bearing 5 positioned directly beneath the bearing 4 and connected to the lower member 2 by means of the web 6. The lower member 2 is provided with an outwardly extending flange 8 which is provided with a number of downwardly extending discharge openings 7 and the outer portion 8' of the flange is provided with a number of openings through which bolts are passed. A distributing chute 9 having two or more outlet spouts 9', is provided with a bearing shoulder 10 which rests upon the bearing 4 and is provided with a rectangular socket 11 which registers with the opening formed through the socket 4. A cylindrical power shaft 12 passes through the bearings 5 and 4 and is provided with a rectangular end 13 which fits within the socket 11. When the power shaft 12 is rotated the distributing chute revolves around the conical portion 3 and as its spouts pass over the discharge openings 7 permits grain or whatever is being fed to pass through the openings. By running the power shaft at any desired speed the length of time it takes for the outlet spouts to pass the openings can be regulated and in this manner the amount of material fed through the opening can be regulated. The upper portion 1 is also substantially conical in shape and is provided with a flange 14 at its lower edge which rests upon the outer portion of the flange 8 and is provided with openings which register with the openings formed in the flange 8 so that the bolts 15 can be passed through the alined openings and the two members rigidly but removably secured in place by means of the nuts 16. The upper end of the member 1 is formed into an inlet opening which is provided with a flange 17 which fits within the distributing chute 9 and thus prevents any danger of the grain getting between the chute and the side of the member 1 thus clogging the machine. The member 1 may be provided with one or more openings in its side through which access may be had to the interior of the machine when it is desired to clean the same. These openings are normally closed by the covers 18.

By having the device constructed as described the machine may be easily put together and may also be easily taken apart when it is desired to give the machine a very thorough cleaning or when it is desired to take the machine apart and move the same or to replace any part of it.

The contacting parts of the distributing chute and the portion 3 of the member 2 are provided with any desired anti-friction bearings so as to cause the distributing chute to run easily. The bearings 4 and 5 can also be provided with anti-friction devices. The upper portion of the member 1 is provided with an outwardly extending flange 19 by means of which the device may be secured to the outlet of a bin if desired.

If desired, the device may be set up in any suitable manner and the grain or other material fed to the inlet by means of a pipe or other suitable conveyer.

What I claim is:—

A stream dividing machine comprising a central bearing, an outwardly and upwardly inclined plate extending from said bearing and having discharge spouts leading therefrom, a chute rotatably mounted upon said bearing and having its outlet traveling in the line of said discharge spouts, a cap inclosing said spout, and having its lower portion terminating in an upwardly and outwardly inclined flange, said flange resting upon the outer portion of said plate, and means for securing said plate and flange together.

In testimony whereof I hereunto affix my signature in presence of two witnesses.

JOHN L. FERGUSON.

Witnesses:
 FRED MILLER,
 H. E. ROGERS.